No. 656,379. Patented Aug. 21, 1900.
G. E. SEYMOUR & F. KAHLER.
BRAKE.
(Application filed June 7, 1900.)
(No Model.) 2 Sheets—Sheet 1.
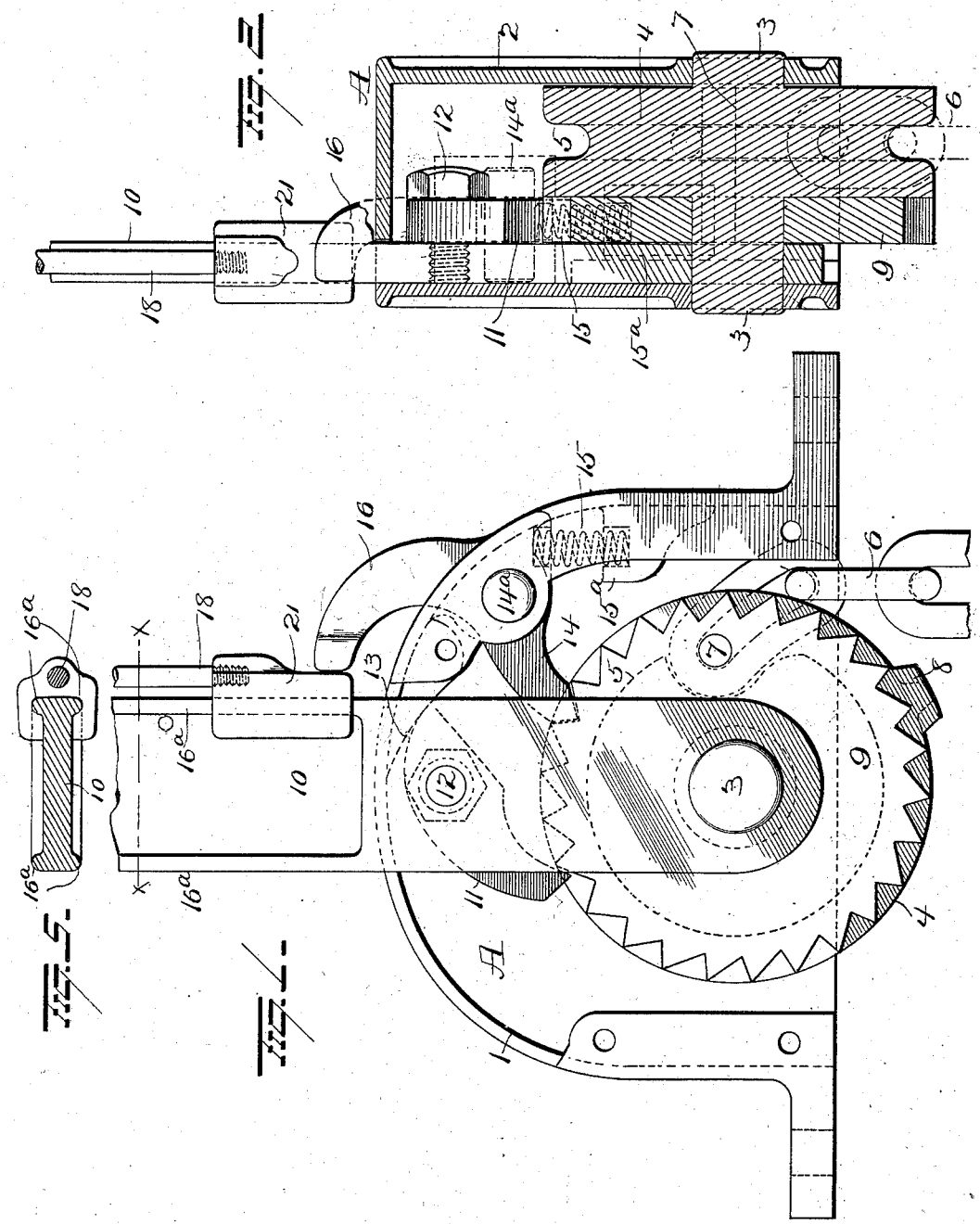

No. 656,379. Patented Aug. 21, 1900.
G. E. SEYMOUR & F. KAHLER.
BRAKE.
(Application filed June 7, 1900.)
(No Model.) 2 Sheets—Sheet 2.
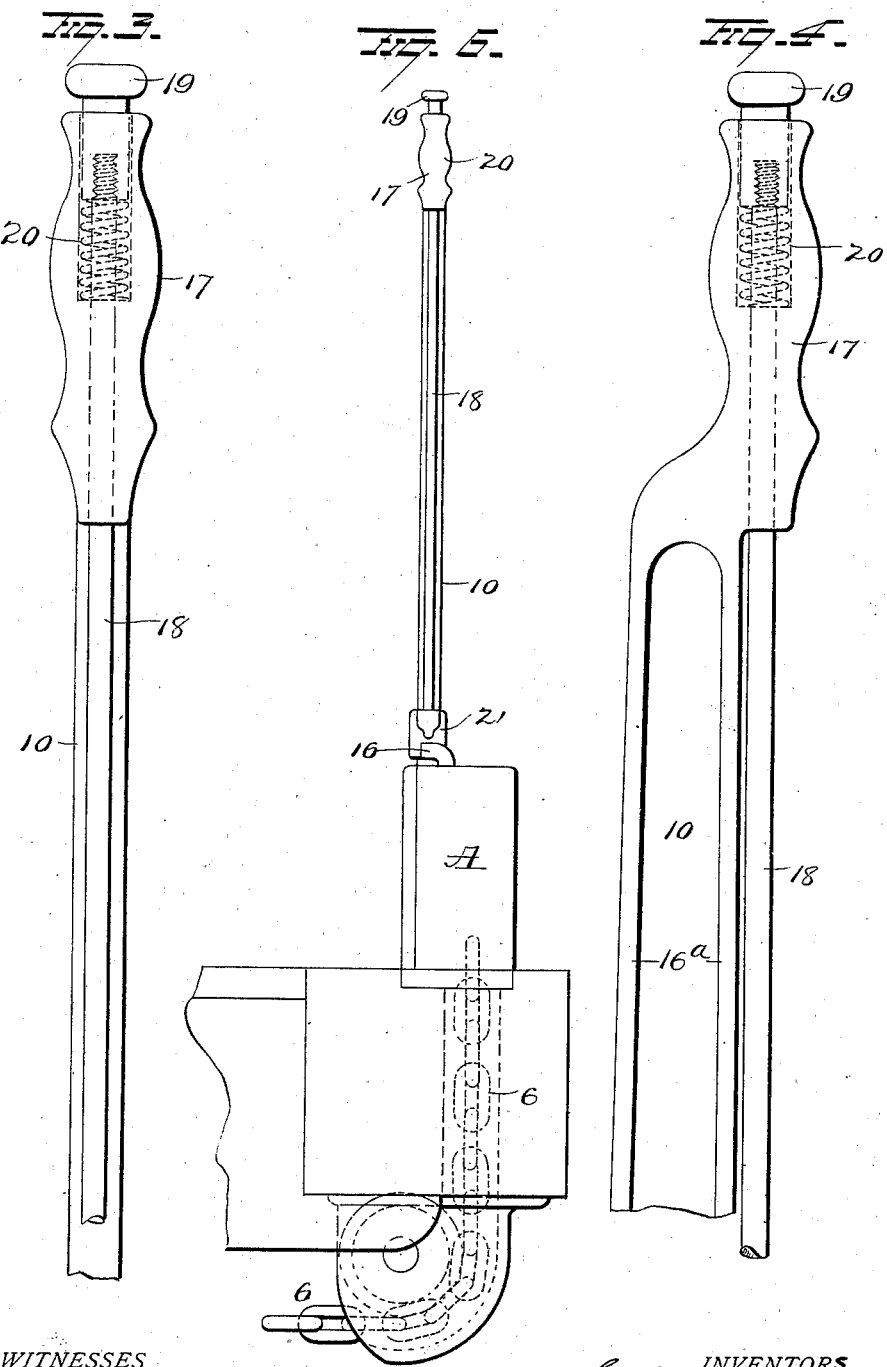

UNITED STATES PATENT OFFICE.

GEORGE E. SEYMOUR AND FERDINAND KAHLER, OF NEW ALBANY, INDIANA.

BRAKE.

SPECIFICATION forming part of Letters Patent No. 656,379, dated August 21, 1900.

Application filed June 7, 1900. Serial No. 19,459. (No model.)

*To all whom it may concern:*

Be it known that we, GEORGE E. SEYMOUR and FERDINAND KAHLER, residents of New Albany, in the county of Floyd and State of Indiana, have invented certain new and useful Improvements in Brakes; and we do hereby declare the following to be a full, clear, and exact description of the invention, such as will enable others skilled in the art to which it appertains to make and use the same.

Our invention relates to an improvement in brakes, and more particularly to brake-operating mechanism, one object of the invention being to provide improved brake-operating mechanism which will by the application of but a slight power exert a strong pull on the chain or cable to apply the brakes and which will permit of instant release of the brakes when desired.

A further object is to provide improved brake-operating mechanism which will be extremely simple in construction, comparatively cheap to manufacture, and most effectual when in use.

With these objects in view the invention consists in certain novel features of construction and combinations and arrangements of parts, as will be more fully hereinafter described, and pointed out in the claims.

In the accompanying drawings, Figure 1 is a view illustrating our improvements. Fig. 2 is a view in section of the same. Figs. 3 and 4 are detail views of the operating-lever. Fig. 5 is a view in section on the line $x\ x$ of Fig. 1, and Fig. 6 is a view showing the application of our improvements to the end of a car.

A represents a housing or casing composed of two sections 1 2, secured together by any approved means and adapted to be secured on the platform of a car or other vehicle. The housing A is made with alined holes to form bearings for a journal 3, on which is secured a pulley or drum 4, provided with a peripheral groove 5 to receive the brake-operating chain or cable 6, which latter is secured to the drum by a pin 7, and the drum is made with a tooth 8 to receive the second link of the chain to firmly engage the same. A ratchet-wheel 9 is mounted on said journal and is secured to one side of the drum, and a lever 10 is fulcrumed at its lower end on the journal beside the ratchet-wheel, and a pawl 11 is pivoted between its ends on a bolt or screw 12, screwed into the lever 10, and is adapted to engage the teeth of the ratchet-wheel to revolve the same when the lever is operated, and the housing A is made with a beveled enlargement 13, adapted to be engaged by one end of the pawl 11 to release the latter from the teeth of the ratchet-wheel when the lever is moved to one extreme position. Another pawl 14 is pivoted between its ends on a bolt or screw 14$^a$ in one end of the housing A and is held in engagement with the teeth on the ratchet-wheel by a spring 15, disposed between the free end of the pawl and an enlargement 15$^a$ on the housing, and said pawl is made with an upwardly-curved arm 16, projecting through the top of the housing, as shown.

The lever 10 is made on each edge with oppositely-disposed flanges 16$^a$ and provided at its upper end with a hollow handhold 17, the central bore of which is approximately in alinement with one edge of the lever, and a rod 18 is disposed in said hollow handhold and has secured thereto a button 19, projecting above the handhold, and a spring 20 is provided in a counterbored portion of said handhold to hold said rod and button in their highest position. The rod 18 extends down parallel with the edge of the lever and has secured to its lower end a beveled block 21, grooved or recessed to slide on the flanged edge of the lever and held out of engagement with the curved arm 16 on pawl 14 by the spring 20, but when depressed by the operator pressing down on the button 19 will lie in the path of the arm 16, and when the lever is moved back will strike the arm 16 and release the pawl 14 from the ratchet-wheel 9 simultaneously with the release of pawl 11 by the enlargement 13, and hence permit the chain or cable to revolve the drum 4 and release the brakes.

The operation of our improvements is as follows: When the lever 10 is moved to the left, the pawl 11 engages the ratchet-wheel 9 and turns the same and drum 4 to wind the chain or cable 6 thereon, when the pawl 14 engages the ratchet-wheel 9 and holds it and the drum in the position to which they are moved by the lever. The lever can then be returned to its former position and again moved to the left if it is necessary to further revolve the drum to stop the vehicle. When it is desired to release the brakes, the button 19 is depressed and the lever thrown to its extreme right-hand position, which will force the block 21 into engagement with the arm 16 and release the pawl 14 simultaneously with the release of pawl 11 by the enlargement 13.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. In a brake-operating mechanism, the combination with a drum and a ratchet-wheel adapted to revolve with the same, of a lever, a pawl on said lever adapted to engage the ratchet-wheel, a pawl independent of the lever and adapted to engage the ratchet-wheel and means carried by the lever for releasing said last-mentioned pawl from the ratchet-wheel.

2. In a brake-operating mechanism, the combination with a housing, of a drum in said housing, a brake-operating chain or cable secured to said drum, a ratchet-wheel adapted to move with the drum, a lever fulcrumed at its end on the drum-support, a pawl on the lever to engage the ratchet-wheel, an enlargement in the housing adapted to release said pawl from the ratchet-wheel when the lever is moved to its normal position, a spring-pressed pawl in said housing in engagement with said ratchet-wheel, a sliding block on said lever normally out of the path of said last-mentioned pawl and adapted when depressed to release the last-mentioned pawl from the ratchet-wheel simultaneously with the release of the first-mentioned pawl.

3. In a brake-operating mechanism, the combination with a housing, a drum mounted therein, a chain or cable attached to the drum and a ratchet-wheel movable with the drum, of a lever, a pawl carried by the lever to engage the ratchet-wheel, means on the housing for moving said pawl out of engagement with the ratchet-wheel, a spring-pressed pawl pivoted to the housing and adapted to engage the ratchet-wheel and means carried by the lever for moving the last-mentioned pawl out of engagement with the ratchet-wheel.

In testimony whereof we have signed this specification in the presence of two subscribing witnesses.

GEORGE E. SEYMOUR.
FERDINAND KAHLER.

Witnesses:
CHAS. A. PROSSER,
NEAL GROSHEIDER.